US012522310B2

(12) United States Patent
Ko

(10) Patent No.: US 12,522,310 B2
(45) Date of Patent: Jan. 13, 2026

(54) BICYCLE AND ELECTRONIC DRIVING OPERATION SYSTEM THEREOF

(71) Applicant: AmTRAN Technology Co., Ltd., New Taipei (TW)

(72) Inventor: Ming-Tsung Ko, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 383 days.

(21) Appl. No.: 18/323,425

(22) Filed: May 25, 2023

(65) Prior Publication Data
US 2024/0253721 A1  Aug. 1, 2024

(30) Foreign Application Priority Data

Feb. 1, 2023  (TW) ................. 112103542

(51) Int. Cl.
| | |
|---|---|
| *B62J 6/26* | (2020.01) |
| *B62J 6/04* | (2020.01) |
| *B62J 45/41* | (2020.01) |
| *B62J 45/413* | (2020.01) |
| *B62J 45/42* | (2020.01) |
| *B62J 50/21* | (2020.01) |
| *B62J 50/22* | (2020.01) |

(52) U.S. Cl.
CPC . *B62J 6/26* (2020.02); *B62J 6/04* (2013.01); *B62J 45/41* (2020.02); *B62J 45/413* (2020.02); *B62J 45/42* (2020.02); *B62J 50/22* (2020.02); *B62J 50/225* (2020.02)

(58) Field of Classification Search
CPC ....... B62J 6/26; B62J 6/04; B62J 45/41; B62J 45/413; B62J 45/42; B62J 50/22; B62J 50/225
See application file for complete search history.

(56) References Cited

U.S. PATENT DOCUMENTS

| | | | |
|---|---|---|---|
| 11,173,977 B1 * | 11/2021 | Chen ...................... | B62J 6/057 |
| 11,718,360 B1 * | 8/2023 | McAllister ............. | A63B 69/16 |
| | | | 280/288.4 |

(Continued)

FOREIGN PATENT DOCUMENTS

| | | | | |
|---|---|---|---|---|
| CN | 202368719 U | * | 8/2012 | ............... B62J 6/00 |
| CN | 105555652 B | | 8/2019 | |

(Continued)

*Primary Examiner* — Quan Zhen Wang
*Assistant Examiner* — Rajsheed O Black-Childress
(74) *Attorney, Agent, or Firm* — CKC & Partners Co., LLC

(57) ABSTRACT

A bicycle and its electronic driving operation system are disclosed. The bicycle electronic driving operation system includes a front assembly and a rear assembly. The front assembly has a display panel, wherein the front assembly is detachably mounted on a hand-bar stem of the bicycle. The rear assembly has a rear camera module and a projection warning area light, wherein the rear assembly is detachably mounted on a seat post of the bicycle. The rear camera module is configured to capture surrounding images. The display panel is electrically connected to the rear camera module and configured to display the surrounding images captured by the rear camera module, and the projection warning area light are configured to project towards two lateral sides of the bicycle to mark a warning area on a ground on the two lateral sides of the bicycle.

13 Claims, 15 Drawing Sheets

(56) References Cited

U.S. PATENT DOCUMENTS

| | | | |
|---|---|---|---|
| 2010/0171832 A1* | 7/2010 | Solida | B62J 50/22 348/148 |
| 2015/0130944 A1 | 5/2015 | Hsu | |
| 2015/0228066 A1 | 8/2015 | Farb | |
| 2019/0002052 A1 | 1/2019 | Chen et al. | |

FOREIGN PATENT DOCUMENTS

| | | |
|---|---|---|
| CN | 113562102 A | 10/2021 |
| TW | M507370 U | 8/2015 |
| TW | 201710142 A | 3/2017 |
| TW | 201902767 A | 1/2019 |

\* cited by examiner

BICYCLE AND ELECTRONIC DRIVING OPERATION SYSTEM THEREOF

RELATED APPLICATIONS

This application claims priority to Taiwan Application Serial Number 112103542, filed Feb. 1, 2023, which is herein incorporated by reference in its entirety.

BACKGROUND

Field of Disclosure

The present disclosure relates to a bicycle and its electronic driving operation system.

Description of Related Art

It is known that most rear-view mirrors mounted in various vehicles are physical rear-view mirrors, e.g., flat mirrors or convex mirrors, which are usually installed on both sides of the handlebars on motorcycles such that a rider can easily see rear surrounding environments while riding a motorcycle to minimizing the risk of accidents. However, mounting a physical rear-view mirror on a bicycle is not very attractive, and the view of the physical rear-view mirror on the handlebar is limited, thereby resulting in low installation willingness. Some prior technologies have disclosed a rear camera module on the bicycle, but the camera module and the connecting wires need to be pre-built or embedded in the bicycle body with matching design, which cannot be easily applied to the bicycles available in the market.

SUMMARY

The present disclosure provides a bicycle and its electronic driving operation system to address the issues in the prior art.

In one or more embodiments, a bicycle electronic driving operation system is configured to be installed on a bicycle. The bicycle electronic driving operation system includes a front assembly and a rear assembly. The front assembly has a display panel, wherein the front assembly is detachably mounted on a hand-bar stem of the bicycle. The rear assembly has a rear camera module and a projection warning area light, wherein the rear assembly is detachably mounted on a seat post of the bicycle. The rear camera module is configured to capture surrounding images. The display panel is electrically connected to the rear camera module and configured to display the surrounding images captured by the rear camera module, and the projection warning area light are configured to project towards two lateral sides of the bicycle to mark a warning area on a ground on the two lateral sides of the bicycle.

In one or more embodiments, the projection warning area light includes two laser projection modules, and the seat post is located between the two laser projection modules.

In one or more embodiments, the rear assembly includes a casing, the casing includes an upper casing and a lower casing, the lower casing has two projection openings, and the two laser projection modules are configured to project light beams to the ground through the two projection openings respectively.

In one or more embodiments, the rear assembly has a circuit control board and a circuit board decorative cover, the circuit control board is electrically connected to the two laser projection modules and the rear camera module, and the circuit control board is located in a chamber formed of the circuit board decorative cover and the lower casing.

In one or more embodiments, the system further includes a rotation sensing module fixed on a head tube of the bicycle and configured to sense a turning direction of the hand-bar stem.

In one or more embodiments, the rotation sensing module includes an upper arc portion and a lower arc portion, the upper arc portion has two touch sensors, the upper arc portion is fixed to the head tube, the lower arc portion has two slopes facing the two touch sensors respectively, the lower arc portion is fixed to a fork top of the bicycle.

In one or more embodiments, the front assembly or the rear assembly includes a plurality of direction indicator lights, the two touch sensors are electrically connected to the front assembly or the rear assembly, and when the lower arc portion rotates relative to the upper arc portion, one of the two touch sensors is actuated by a corresponding one of the two slopes to cause a corresponding one of the direction indicator lights to light up.

In one or more embodiments, the system further includes a brake sensing module fixed on a brake wire of the bicycle and configured to sense whether the brake wire is pulled.

In one or more embodiments, a bicycle includes a bicycle body and an electronic driving operation system. The bicycle body includes a hand-bar stem, a seat post and a rear wheel. The electronic driving operation system includes a front assembly and a rear assembly, wherein the front assembly is detachably mounted on the hand-bar stem, the rear assembly is detachably mounted on the seat post, wherein the front assembly has a display panel, the rear assembly has a rear camera module and a projection warning area light, the rear camera module is configured to capture surrounding images, the display panel is electrically connected to the rear camera module and configured to display the surrounding images captured by the rear camera module, the projection warning area light is configured to emit light beams toward two lateral sides of the bicycle body to mark a warning area on a ground on the two lateral sides of the bicycle body, and the warning area is configured to define safety distances from two lateral sides and a rear side of the rear wheel.

In one or more embodiments, the projection warning area light includes two laser projection modules, and the rear wheel is located between the two laser projection modules.

In one or more embodiments, the rear assembly includes a casing, the casing includes an upper casing and a lower casing, the lower casing has two projection openings, and the two laser projection modules are configured to project light beams to the ground through the two projection openings respectively.

In one or more embodiments, the bicycle body further includes a brake sensing module fixed on a brake wire of the bicycle body and configured to sense whether the brake wire is pulled.

In one or more embodiments, the bicycle body further includes a rotation sensing module fixed on a head tube of the bicycle and configured to sense a turning direction of the hand-bar stem.

In one or more embodiments, the rotation sensing module includes an upper arc portion and a lower arc portion, the upper arc portion has two touch sensors, the upper arc portion is fixed to the head tube, the lower arc portion has two slopes facing the two touch sensors respectively, the lower arc portion is fixed to a fork top of the bicycle.

In one or more embodiments, the front assembly or the rear assembly includes a plurality of direction indicator lights, the two touch sensors are electrically connected to the front assembly or the rear assembly. When the lower arc portion rotates relative to the upper arc portion, one of the touch sensors is actuated by a corresponding one of the two slopes to cause a corresponding one of the direction indicator lights to light up.

In sum, the bicycle electronic driving operation system disclosed herein realizes safety protection functions such as electronic rear mirror and projection warning area light by means of its front and rear assembly, and can sense vehicle speed, braking, steering and other driving conditions through sensors. In addition, the electronic driving operation system can be installed without modifying the bicycle body.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
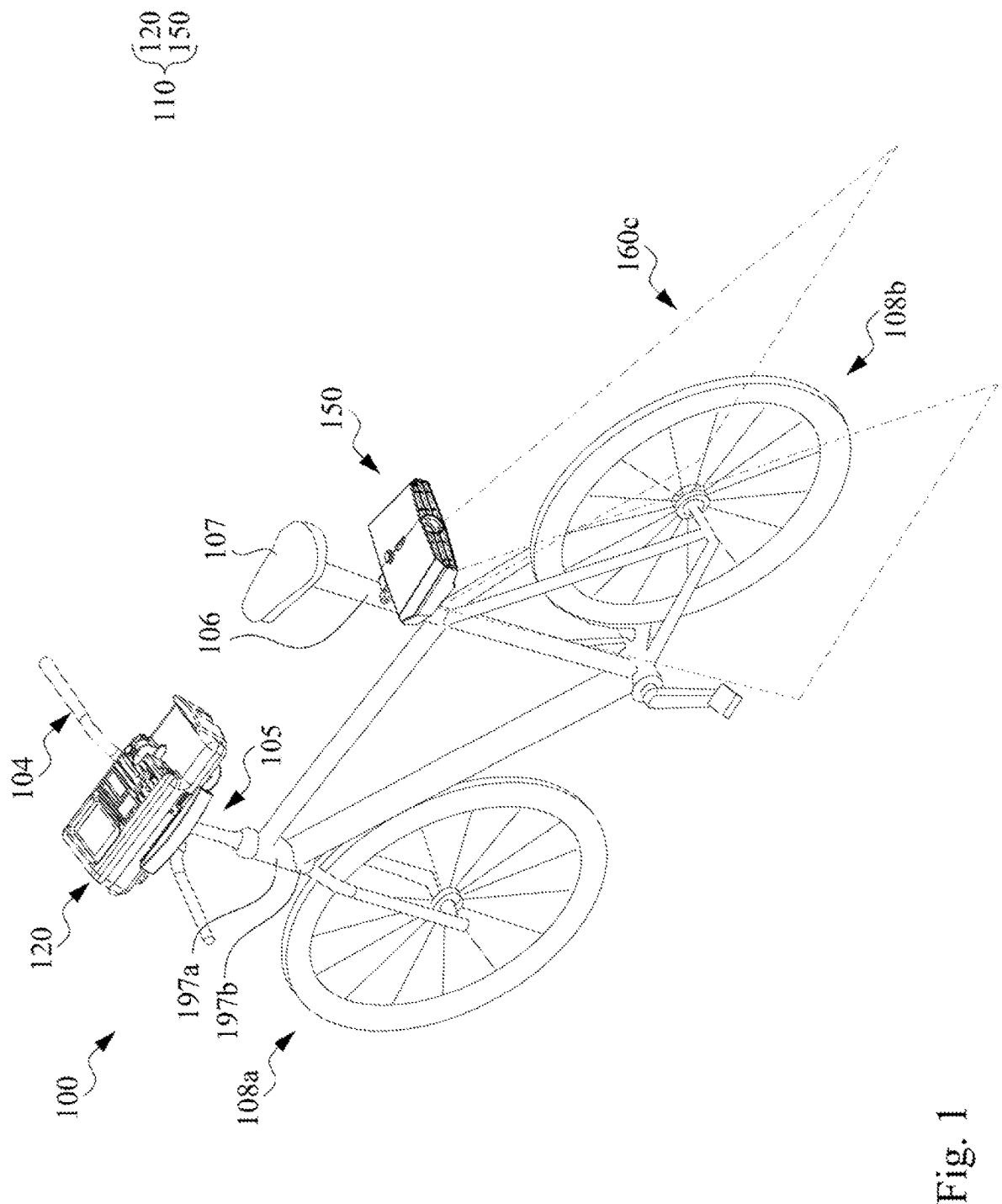
FIG. 1 illustrates a perspective view of a bicycle with an electronic driving operation system installed according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which illustrates a perspective view of a bicycle with an electronic driving operation system 110 installed according to an embodiment of the present disclosure. The bicycle 100 includes a bicycle body and an electronic driving operation system 110. The bicycle body includes a handle bar 104, a hand-bar stem 105, a front wheel 108*a*, a rear wheel 108*b*, a seat post 106, a saddle 107 and other structures. The electronic driving operation system 110 includes a front assembly 120 and a rear assembly 150. The front assembly 120 is detachably mounted on the hand-bar stem 105 of the bicycle body for operation and use by the bicycle rider. The rear assembly 150 is detachably mounted on the seat post 106 of the bicycle body for operation and use by the bicycle rider. The rear assembly 150 has a projection warning area light at its bottom. The projection warning area light is used to project light beams 160*c* onto the ground to form a warning area.

Figure 2:
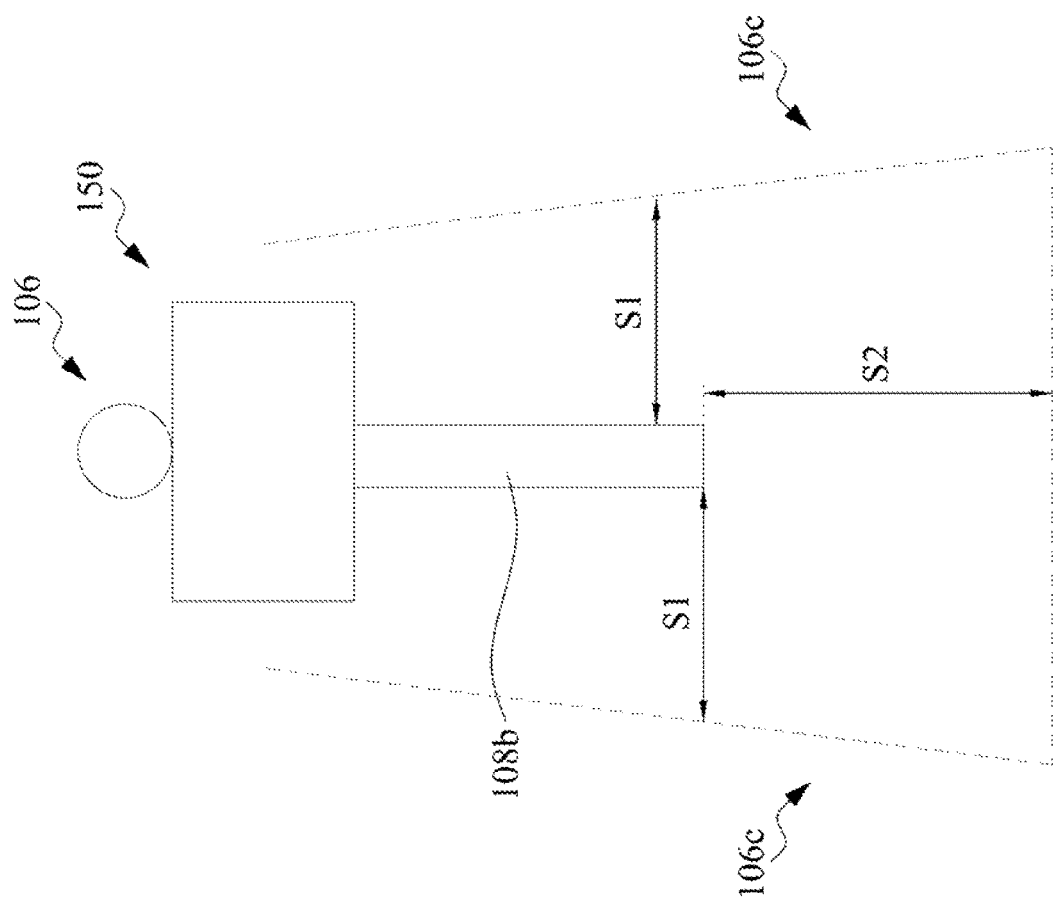
FIG. 2 illustrates a plan view showing a functionality of a projection warning area light according to an embodiment of the present disclosure.

Reference is made to FIG. 2, which illustrates a functional schematic diagram of a projection warning area light for a bicycle according to an embodiment of the present disclosure. This diagram shows a functional schematic diagram of the rear assembly 150 viewed from a top view direction. The projection warning area light, which is located at the bottom of the rear assembly 150, projects two beams of light 160*c* at two lateral sides of the rear wheel 108*b* to form a warning area. Each beam of light 160*c* indicates the safety distance from the lateral sides and the rear side of the rear wheel 108*b*. For example, the light beams 160*c* can indicate a safety distance S1 from the lateral side of the rear wheel 108*b* and indicate a safety distance S2 from the rear side of the rear wheel 108*b*. The projection warning area light reminds vehicles approaching from behind to maintain a safe distance to prevent collisions or accidents, especially during low light conditions at night. It can also alert others not to approach the bicycle when the user is using a stationary training platform to avoid any accidental injury.

Figure 3:
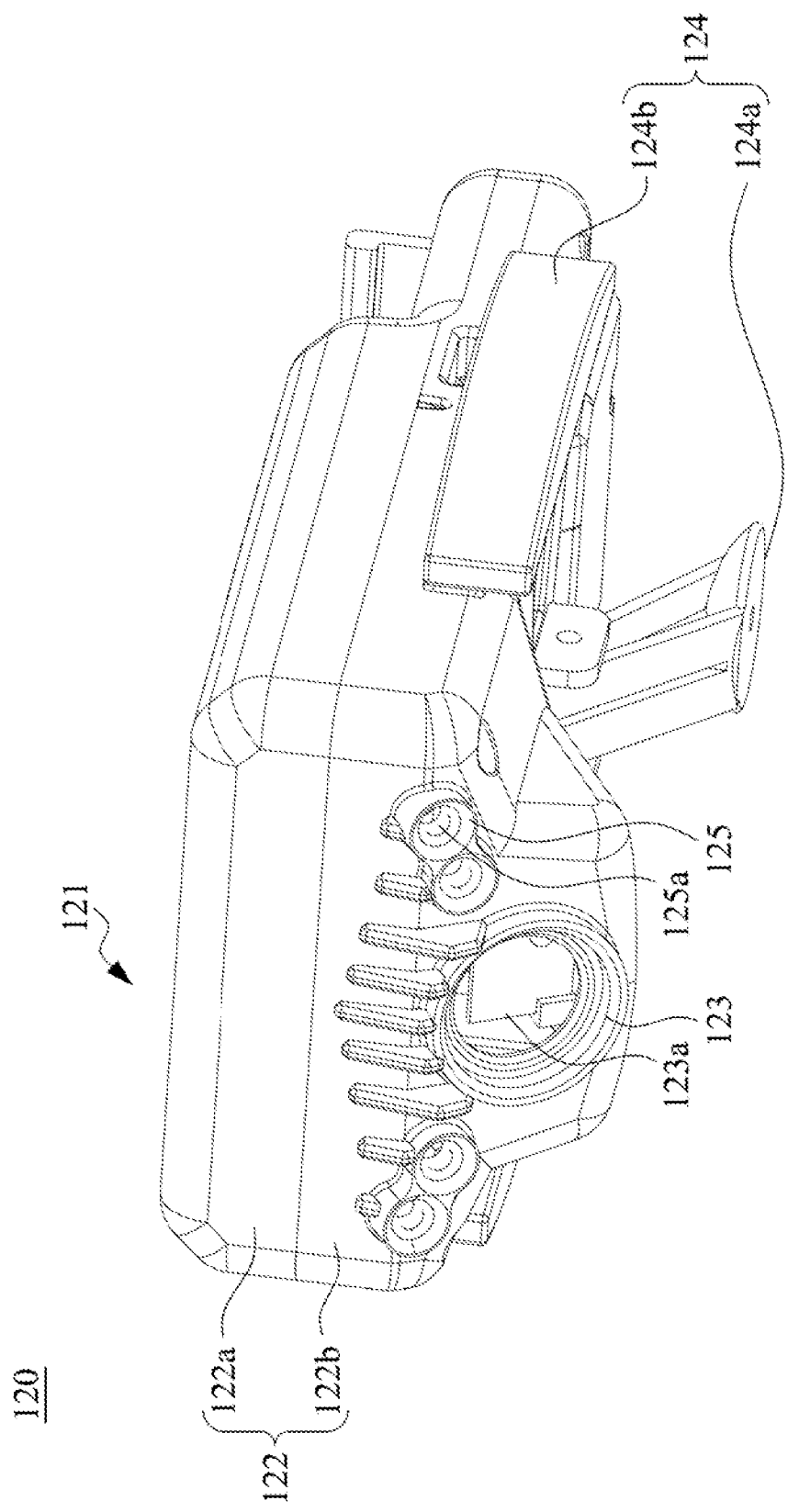
FIG. 3 illustrates a perspective view of a front assembly of a bicycle electronic driving operation system according to an embodiment of the present disclosure.
Figure 4:
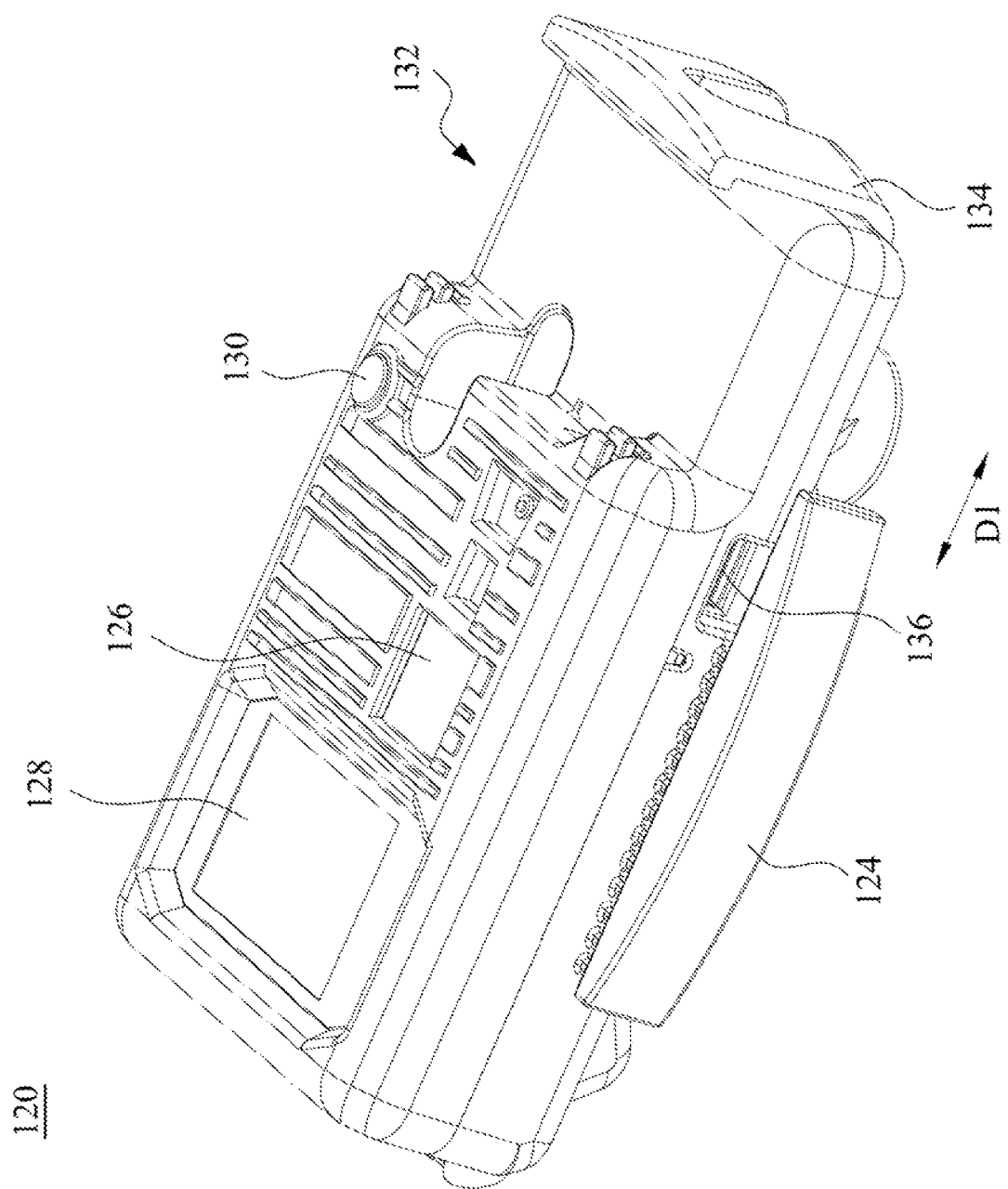
FIG. 4 illustrates another perspective view of a front assembly of a bicycle electronic driving operation system according to an embodiment of the present disclosure.
Figure 5:
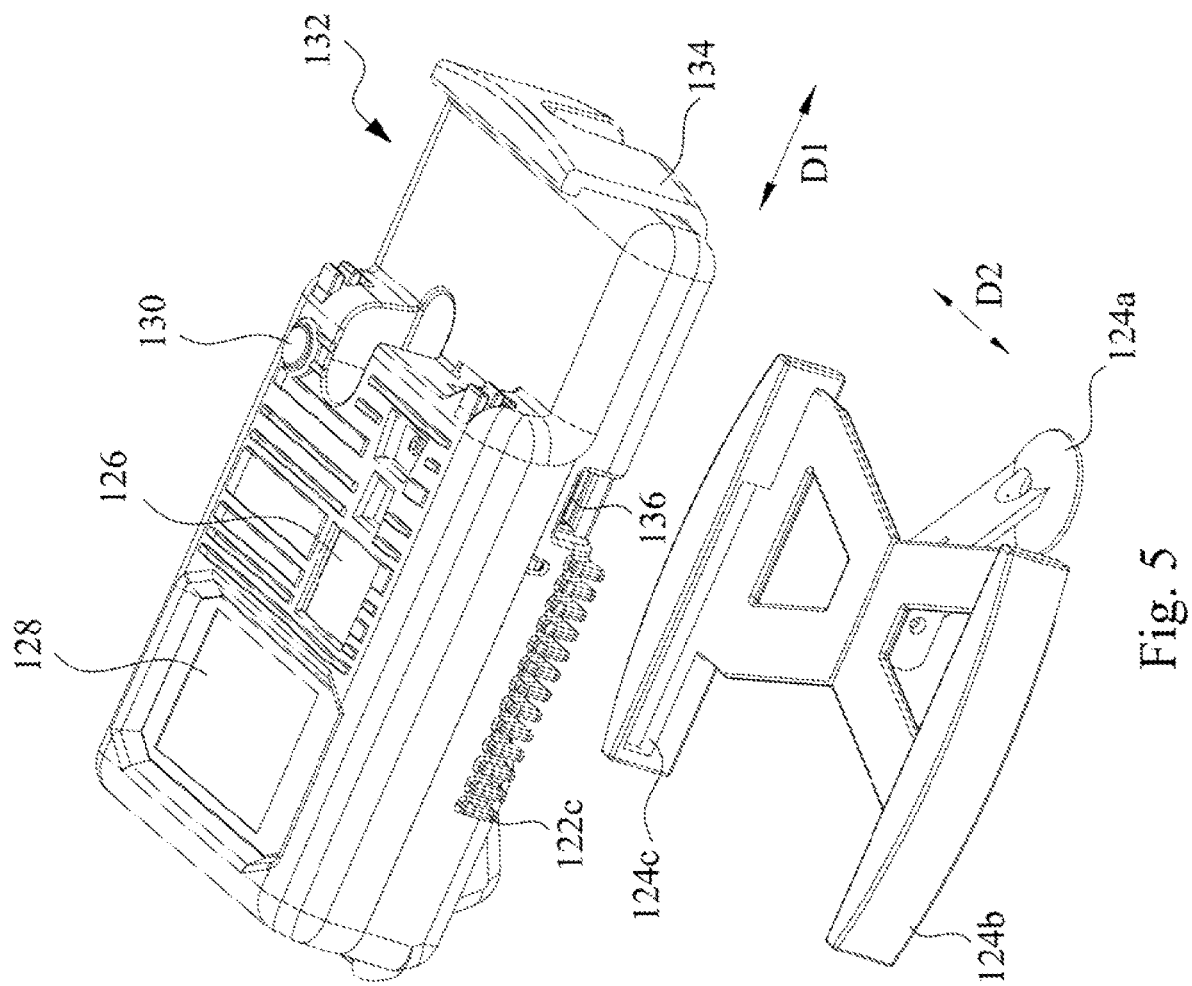
FIG. 5 illustrates an exploded view of a front assembly of a bicycle electronic driving operation system according to an embodiment of the present disclosure.

Reference is made to FIGS. 3-5, FIG. 3 illustrates a perspective view of a front assembly of a bicycle electronic driving operation system according to an embodiment of the present disclosure, FIG. 4 illustrates another perspective view of a front assembly of a bicycle electronic driving operation system according to an embodiment of the present disclosure, and FIG. 5 illustrates an exploded view of a front assembly of a bicycle electronic driving operation system according to an embodiment of the present disclosure. The front assembly 120 includes a main body 121 and a rack 124. A foot portion 124*a* of the rack 124 is utilized to mount on the hand-bar stem 105 of the bicycle (referring also to FIG. 1). Two clamps 124*b* of the rack 124 are used for detachably holding the main body 121 on the hand-bar stem 105 of the bicycle. A front portion of the main body 121 includes direction indicator lights and headlights. For example, headlight panels 123a can output light beams through headlight openings 123 respectively, and direction indicator lights 125a can output light beams through direction indicator light openings 125 respectively. A housing 122 of the front assembly 120 includes an upper housing 122a and a lower housing 122b.

Referring to FIG. 4, the front assembly 120 further includes a chronograph/speedometer screen 126, a display screen 128, a power switch 130, a clamping groove 132, clamping arms 134, and a charging slot 136. The chronograph/speedometer screen 126 is used for displaying functions such as bicycle speed or timing. This function can be measured by installing a sensor on the bicycle body to measure a magnetic element rotating with the wheel to record the speed. The measured data is sent back to the front assembly 120, and convert it into the speed or traveled distance by the processor or the sensor control chip. In some embodiments of the present disclosure, the wheel and/or the wheel rim may be equipped with a Hall Effect sensor in a detachable manner to measure a rotation speed of the wheel rim to calculate a vehicle speed. When the rear wheel is removed and fixed on a training platform, the Hall Effect sensor can be reinstalled or the front assembly 120 may receive the rotation speed sensed by the training platform to simulate the speed of the vehicle. The display screen 128 is used for displaying image information, for example, displaying surrounding images captured by the rear assembly so as to perform the function of an electronic rear-view mirror. The power switch 130 is connected to the circuit control board 131 (referring to FIG. 6) in the main body so as to control the activation or deactivation of all functions of the front assembly 120. The clamping arms 134 slides relative to the main body along the directions D1 to hold a mobile communication device (such as a smart phone) or a mobile power supply in the clamping groove 132, serving as a navigation device. The charging slot 136 is connected to the mobile power supply 133 in the main body to charge the mobile power supply 133 using an external power source. In some embodiments, the front assembly 120 may not have the display screen 128 or the chronograph/speedometer screen 126, and the circuit control board 131 has a wireless signal transmission module (e.g., a wireless communication module 135), which is communication to the clamped mobile communication device, such that the mobile communication device displays surrounding images captured by the rear assembly and/or perform the same functions as the chronograph/speedometer screen 126.

Referring to FIG. 5, the two clamps 124b are used to detachably clamp and secure the main body 121 on the hand-bar stem 105 of the bicycle. The two clamps 124b can be expanded or contracted relative to each other along the direction D2 to clamp or disassemble the main body 121, and the direction D2 is substantially perpendicular to the direction D1. A groove 124c of each clamp 124b is used to engage a protruding structure 122c on the side of the main body 121 during clamping, so as to secure the main body 121 firmly.

Figure 6:
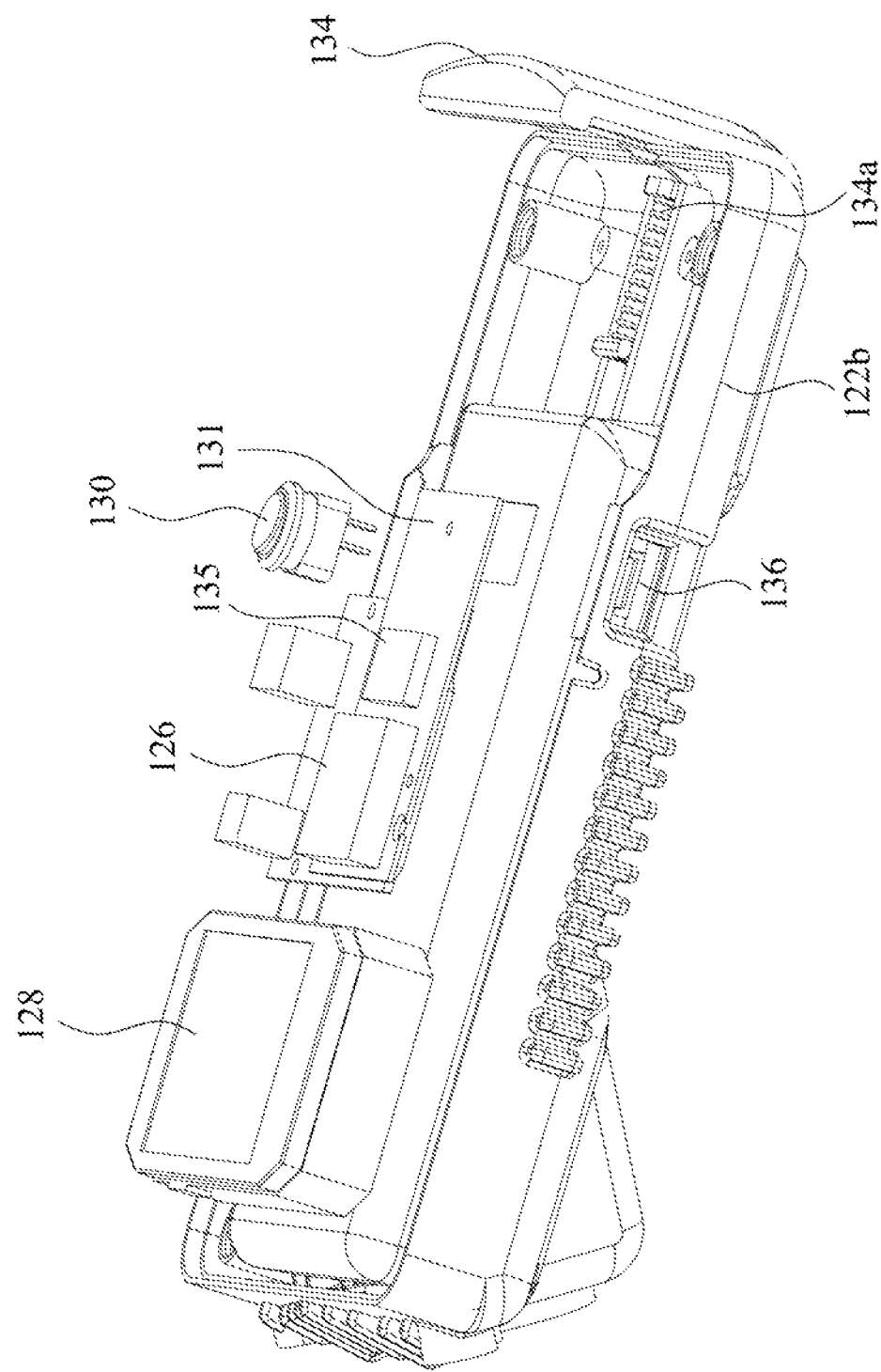
FIG. 6 illustrates a main body (with its upper casing removed) of a front assembly of a bicycle electronic driving operation system according to an embodiment of the present disclosure.
Figure 7:
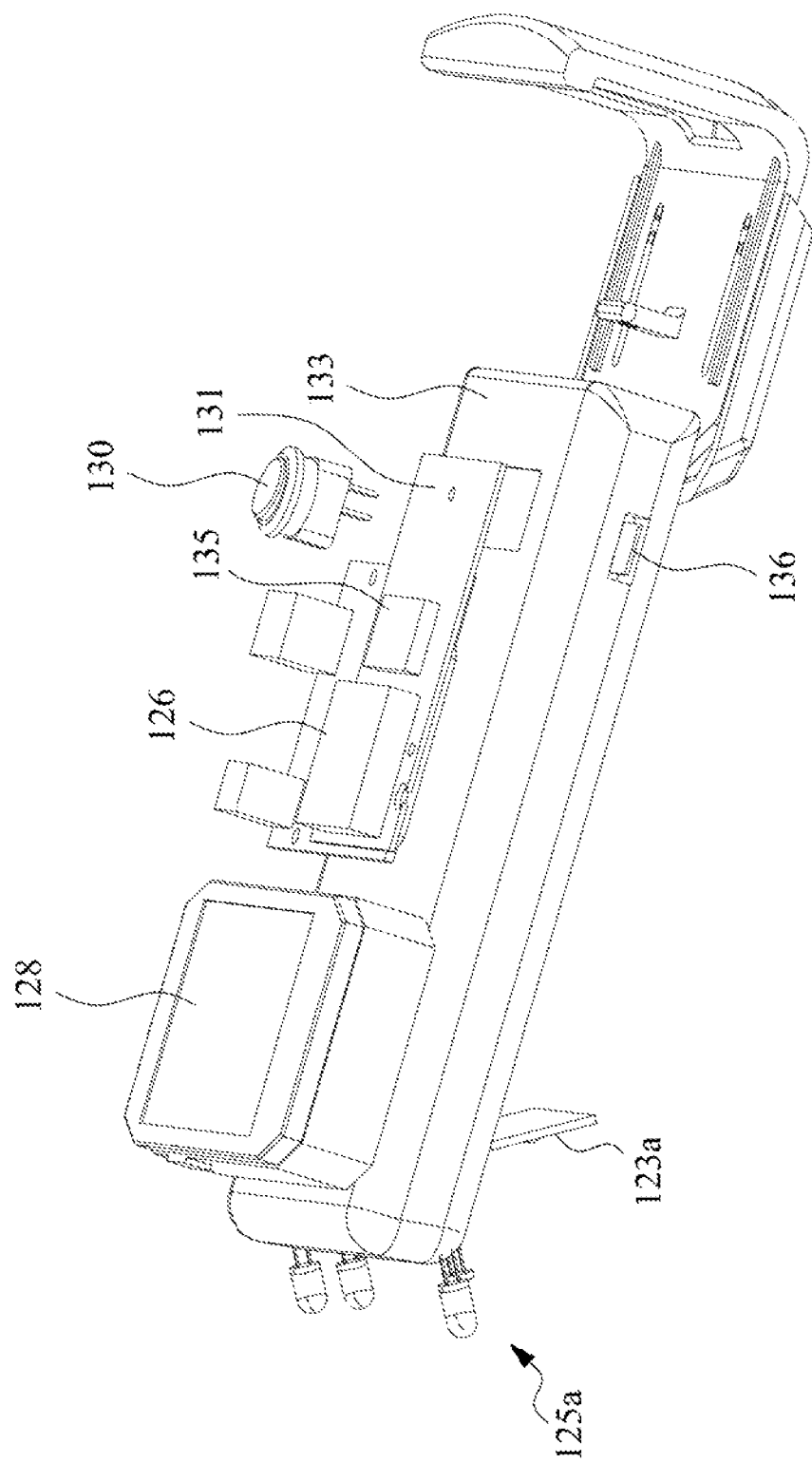
FIG. 7 illustrates a main body (with its both upper casing and lower casing removed) of a front assembly of a bicycle electronic driving operation system according to an embodiment of the present disclosure.

Reference is made to FIGS. 6-7, FIG. 6 illustrates a main body (with its upper casing removed) of a front assembly of a bicycle electronic driving operation system according to an embodiment of the present disclosure, and FIG. 7 illustrates a main body (with its both upper casing and lower casing removed) of a front assembly of a bicycle electronic driving operation system according to an embodiment of the present disclosure. The clamping arms 134 are slidably connected to the lower housing 122b, and provide the clamping force by means of the elastic force of the tension spring 134a. The front assembly also includes components such as a circuit control board 131 and a mobile power supply 133. The circuit control board 131 is a control center of the front assembly, and the power switch 130 is connected to the circuit control board 131 to enable or disable the power supply. The wireless communication module 135 on the circuit control board 131 is used to execute the wireless communication between the front assembly 120 and the rear assembly 150 or other sensing modules (such as brake sensing module or rotation sensing module). The chronograph/speedometer screen 126 is connected to the circuit control board 131 to display the bicycle speed or timing results, and the circuit control board 131 is connected to sensors (such as the Hall effect sensor) to obtain measurement information. The circuit control board 131 also includes processors and storage elements to execute calculation or control functions of the electronic driving operation system. The mobile power supply 133 is connected to the circuit control board 131, the direction indicator lights 125a, the headlight panels 123a and the display screen 128, etc., so as to provide electric power required for operation. The mobile power supply 133 has a charging slot 136 for charging the mobile power supply 133 with an external power source. The front assembly 120 can also integrate functions such as speakers, driving recorders, electronic horns, and all the above-mentioned functions, so as to avoid clutter and imbalance caused by too many electronic devices on the hand-bar stem, and to avoid complicated installation.

Figure 8:
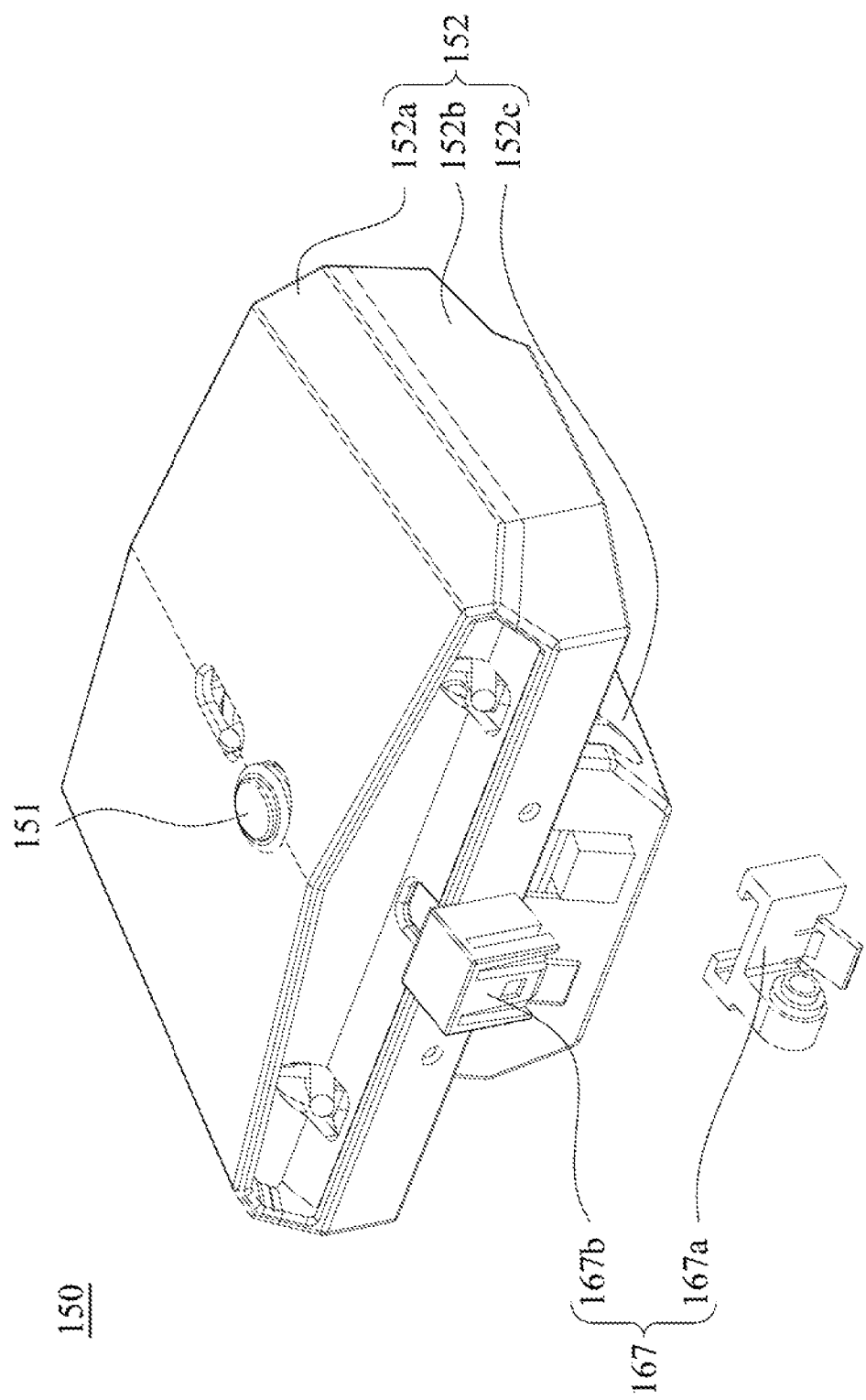
FIG. 8 illustrates a perspective view of a rear assembly of a bicycle electronic driving operation system according to an embodiment of the present disclosure.
Figure 9:
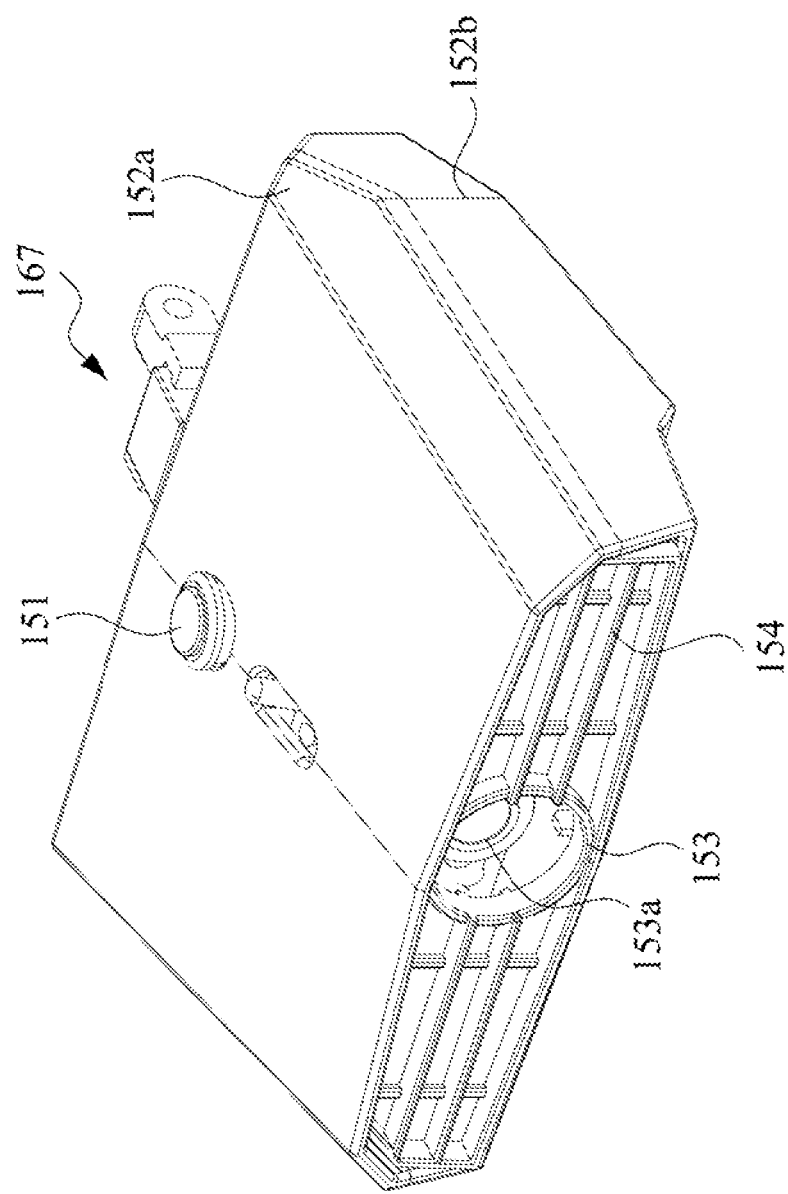
FIG. 9 illustrates another perspective view of a rear assembly of a bicycle electronic driving operation system according to an embodiment of the present disclosure.
Figure 10:
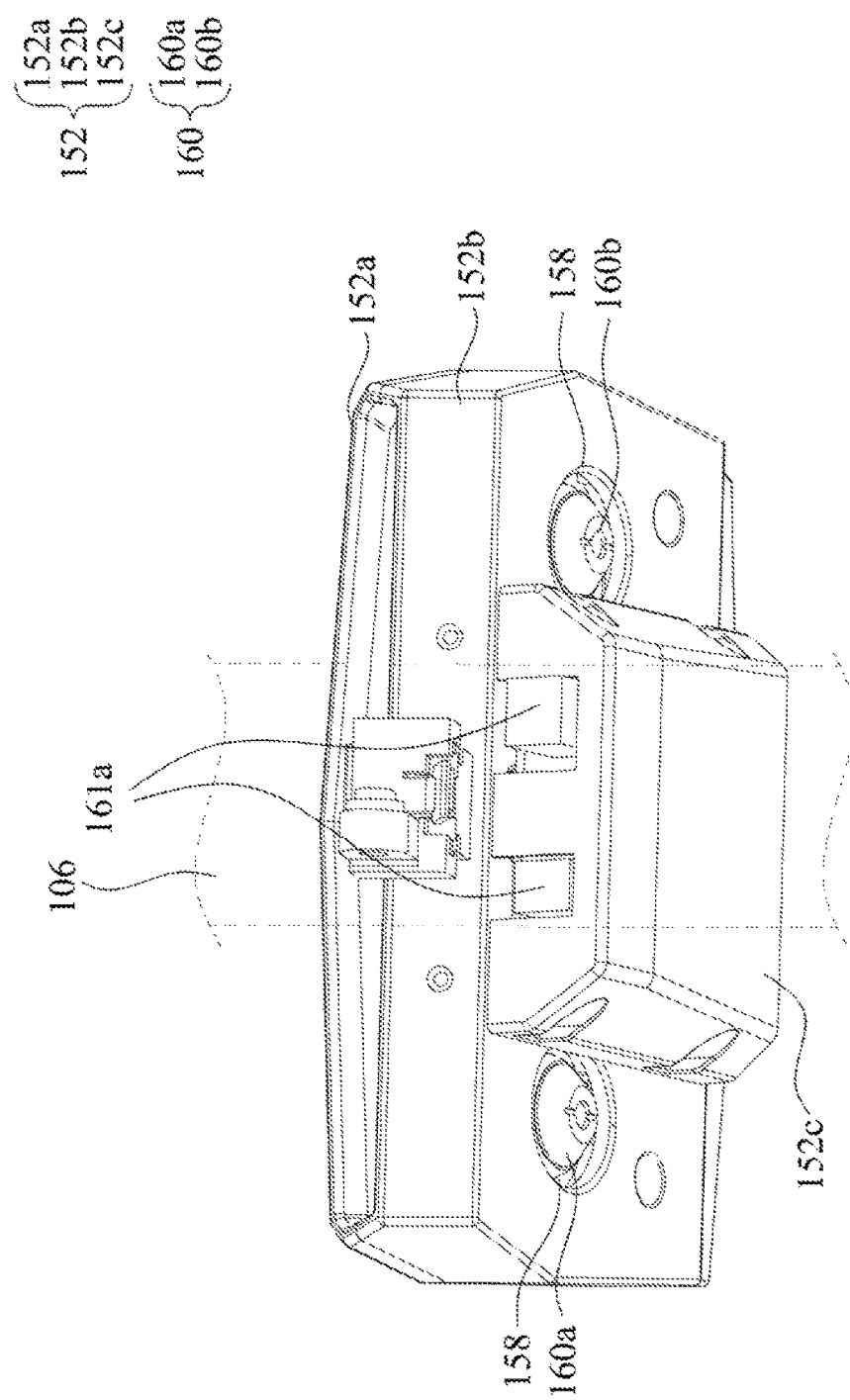
FIG. 10 illustrates still another perspective view of a rear assembly of a bicycle electronic driving operation system according to an embodiment of the present disclosure.

Reference is made to FIGS. 8-10, FIG. 8 illustrates a perspective view of a rear assembly of a bicycle electronic driving operation system according to an embodiment of the present disclosure, FIG. 9 illustrates another perspective view of a rear assembly of a bicycle electronic driving operation system according to an embodiment of the present disclosure, and FIG. 10 illustrates still another perspective view of a rear assembly of a bicycle electronic driving operation system according to an embodiment of the present disclosure. The rear assembly 150 includes functional designs such as a quick install/uninstall mechanism 167, a switch 151, a rear camera module, direction indicator lights, and a projection warning area light 160. The quick install/uninstall mechanism 167 includes a locking member 167a and an engaging member 167b. The locking member 167a is locked on the seat post 106 (referring also to FIG. 1). The rear assembly 150 is detachably mounted on the locking member 167a by means of the engaging member 167b such that the rear assembly 150 can be disassembled from and assembled to the bicycle body quickly. The switch 151 is connected to the circuit control board 161 in the body (referring also to FIG. 11), so as to control the activation or deactivation of some or all functions of the rear assembly 150. The rear assembly 150 has a rear-view opening 153 (located on a shield 154) to expose the rear camera module 153a. The rear camera module 153a is used to capture surrounding images and transmit them to the display screen 128 of the front assembly 120 for output, so as to perform the function of an electronic rear-view mirror.

The casing 152 of the rear assembly 150 includes an upper casing 152a, a lower casing 152b, and a circuit board decorative cover 152c. A combined chamber of the upper casing 152a and the lower casing 152b mainly accommodates the rear camera module and various indicator lights. The circuit board decorative cover 152c and the lower casing 152b are combined to form a chamber to accommodate the circuit control board and the mobile power supply. The lower casing 152b has two projection openings 158. The projection warning area light 160 includes two laser projection modules 160*a* and 160*b*, which correspond to project light beams via the two projection openings 158 to the ground respectively. When the rear assembly 150 is installed on the seat post 106 of the bicycle, the seat post 106 is located between the two laser projection modules 160*a* and 160*b* such that the two laser projection modules 160*a* and 160*b* project two groups of light beams 160*c* on the two lateral sides of the rear wheel 108*b* respectively so as to constitute a warning area.

Figure 11:
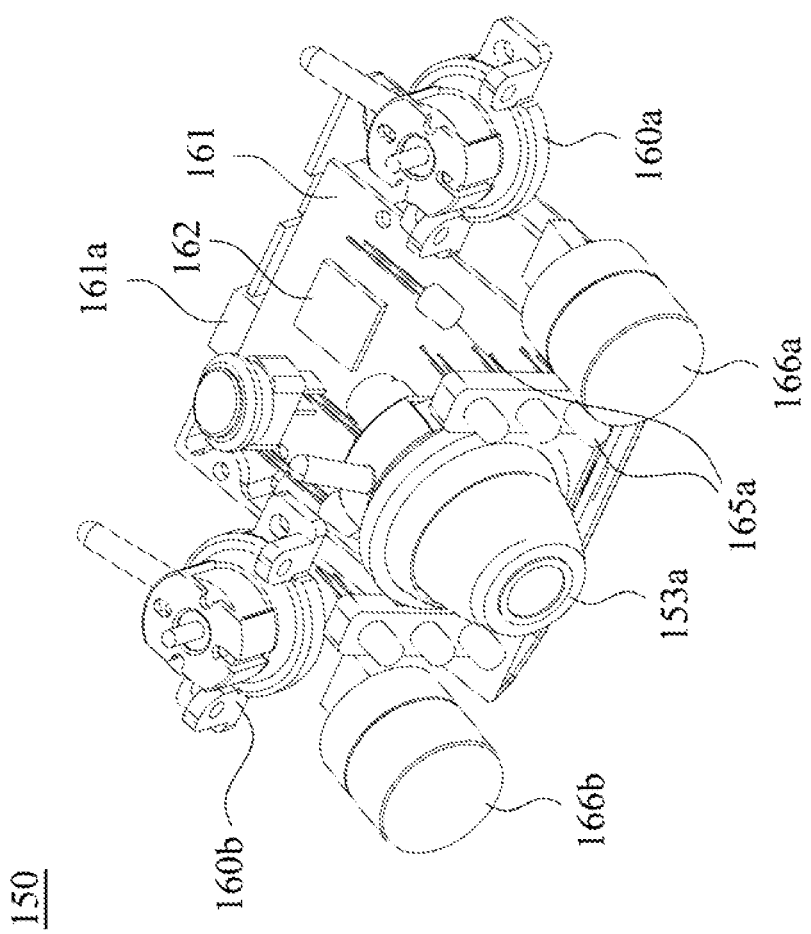
FIG. 11 illustrates a rear assembly (with its both upper casing and lower casing removed) of a bicycle electronic driving operation system according to an embodiment of the present disclosure.

Reference is made to FIG. 11, which illustrates exposed components of a rear assembly (with its both upper casing and lower casing removed) of a bicycle electronic driving operation system according to an embodiment of the present disclosure. These components include two laser projection modules 160*a* and 160*b*, two direction indicator lights 166*a* and 166*b*, various indicator lights 165*a* and 165*b*, a rear camera module 153*a*, a circuit control board 161, a wireless communication module 162 and a photosensitive control sensing module 163 and so on. The two direction indicator lights 166*a* and 166*b* are electrically connected to the circuit control board 161, so as to be driven to light up when the bicycle is turning in directions. The indicator lights 165*a* and 165*b* are electrically connected to the circuit control board 161 and can be used as rear lights or brake lights at night. The photosensitive control sensing module 163 is connected to the circuit control board 161 to detect the brightness of the environment, so as to drive the nighttime lighting or the laser projection modules 160*a* and 160*b* to light up. The circuit control board 161 is connected to the front assembly 120 through its power socket 161*a* to obtain power, or a mobile power supply may be placed in the rear assembly to provide the required power, which can be charged through the power socket 161*a*. The circuit control board 161 may communicate with the circuit control board 131 of the front assembly (e.g., by the wireless communication module 135) and communicate with the mobile communication device clamped in the clamping groove 132 by wireless signal transmission communication (such as via the wireless communication module 162), users can control or adjust the power supply and various functional modules of the rear assembly via the front assembly or mobile communication devices.

Figure 12:
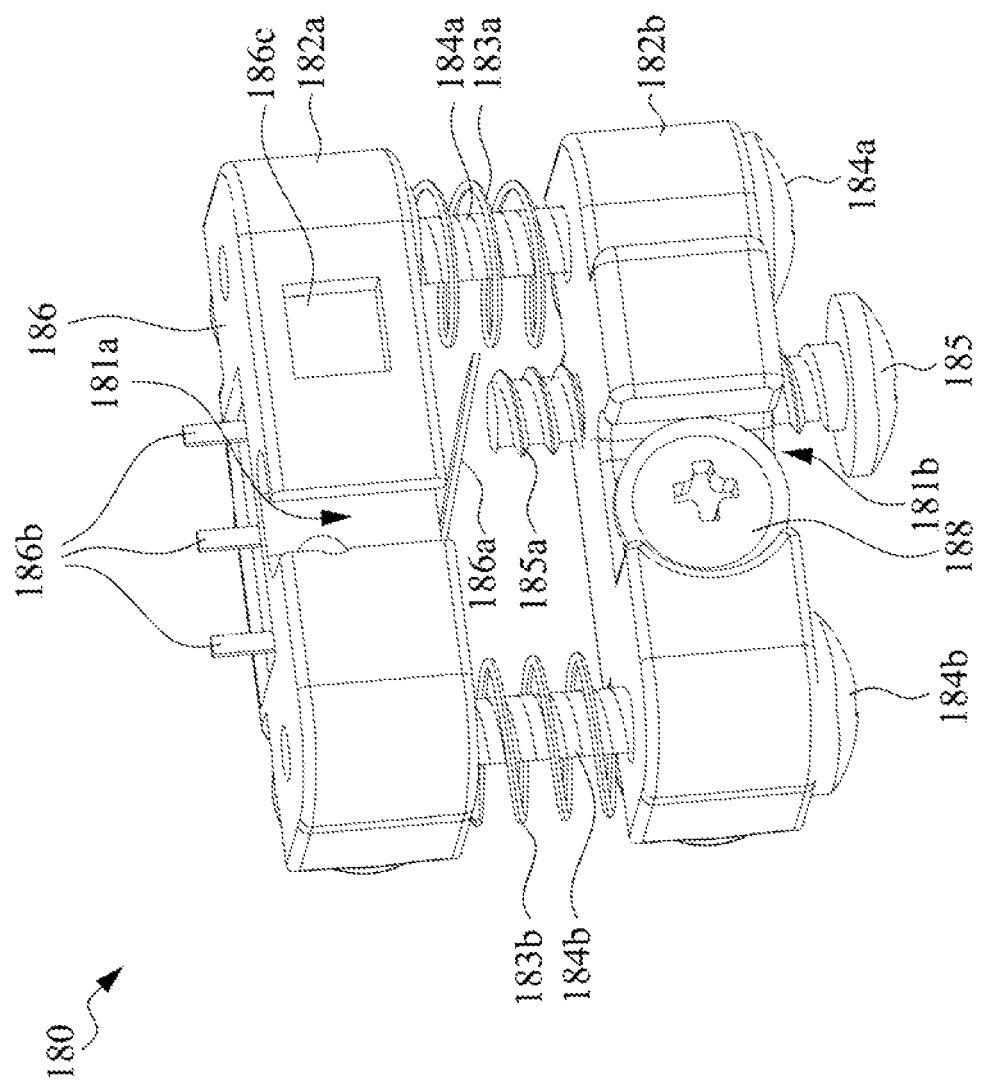
FIG. 12 illustrates a perspective view of a brake sensing module of a bicycle electronic driving operation system according to an embodiment of the present disclosure.
Figure 13:
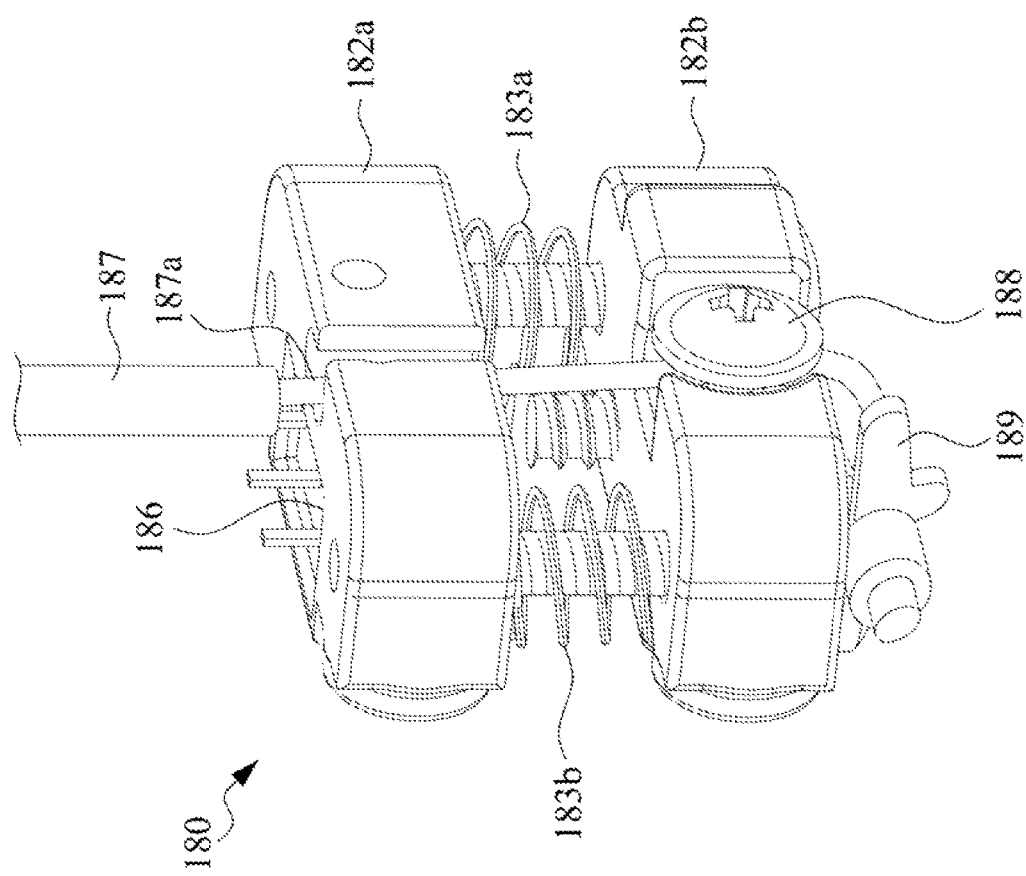
FIG. 13 illustrates a perspective view of a brake sensing module of a bicycle electronic driving operation system installed on a brake wire according to an embodiment of the present disclosure.

Reference is made to FIGS. 12-13, FIG. 12 illustrates a perspective view of a brake sensing module of a bicycle electronic driving operation system according to an embodiment of the present disclosure, and FIG. 13 illustrates an application status diagram of a brake sensing module of a bicycle electronic driving operation system installed on a brake wire according to an embodiment of the present disclosure. The brake sensing module 180 can be applied on brakes at the front and/or rear wheel of the bicycle, so as to selectively drive the brake lights of the rear assembly 150 to light up or not. The brake sensing module 180 is installed between a cable tube end 187 of a brake cable and a brake actuator 189. The brake sensing module 180 mainly includes a sensor holding portion 182*a* and an actuating portion 182*b*. The sensor holding portion 182*a* and the actuating portion 182*b* are connected in series by two substantially parallel rods 184*a* and 184*b*. Compression springs 183*a* and 183*b* are sleeved on the rods 184*a* and 184*b* respectively, and are located between the sensor holding portion 182*a* and the actuating portion 182*b*, so as to maintain a distance therebetween. A wire core 187*a* of the brake cable is positioned in a wire groove 181*a* of the sensor holding portion 182*a* and a wire groove 181*b* of the actuating portion 182*b*, and the wire core 187*a* is secured in the wire groove 181*b* of the actuating portion 182*b* by a brake wire locking member 188.

The sensor holding portion 182*a* is used for accommodating a touch sensor 186, and a sensing piece 186*a* of the touch sensor 186 is located between the sensor holding portion 182*a* and the actuating portion 182*b*. In some embodiments, a plurality of terminals 186*b* of the touch sensor 186 are electrically connected to the rear assembly 150. In other embodiments, the brake sensing module 180 has a wireless communication module 186*c* (located at the sensor holding portion 182*a*), the touch sensor 186 is electrically connected to the wireless communication module 186*c*, and transmits signals to the front assembly 120 or the rear assembly 150 to control the brake lights of the rear assembly 150 to light up. The actuating portion 182*b* is equipped with an actuating screw 185, and a tail end 185*a* of the actuating screw 185 is opposite to the sensing piece 186*a* of the touch sensor 186. When the wire core 187*a* of the brake cable is pulled (e.g., applying a brake to stop a bicycle), the brake actuator 189 is pulled simultaneously, thereby compressing the distance between the sensor holding portion 182*a* and the actuating portion 182*b* such that the tail end 185*a* of the actuating screw 185 pushes the sensing piece 186*a* of the touch sensor 186, the touch sensor 186 continuously sends signals to the rear assembly 150 and the brake light begins to flash. After the wire core 187*a* of the brake cable is released, the compression springs 183*a* and 183*b* assisting in compressing the sensor holding portion 182*a* and the actuating portion 182*b* recover such that the tail end 185*a* of the actuating screw 185 no longer pushes the sensing piece 186*a* of the touch sensor 186 and the touch sensor 186 stop sending signals to the rear assembly 150 and the brake light stop flashing.

Figure 14:
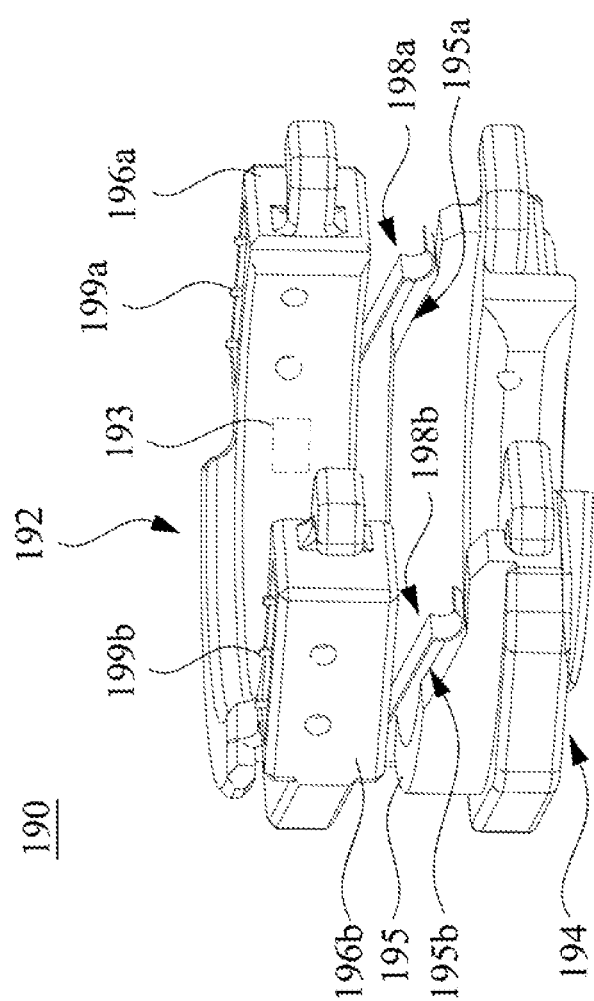
FIG. 14 illustrates a perspective view of a rotation sensing module of a bicycle electronic driving operation system according to an embodiment of the present disclosure.
Figure 15:
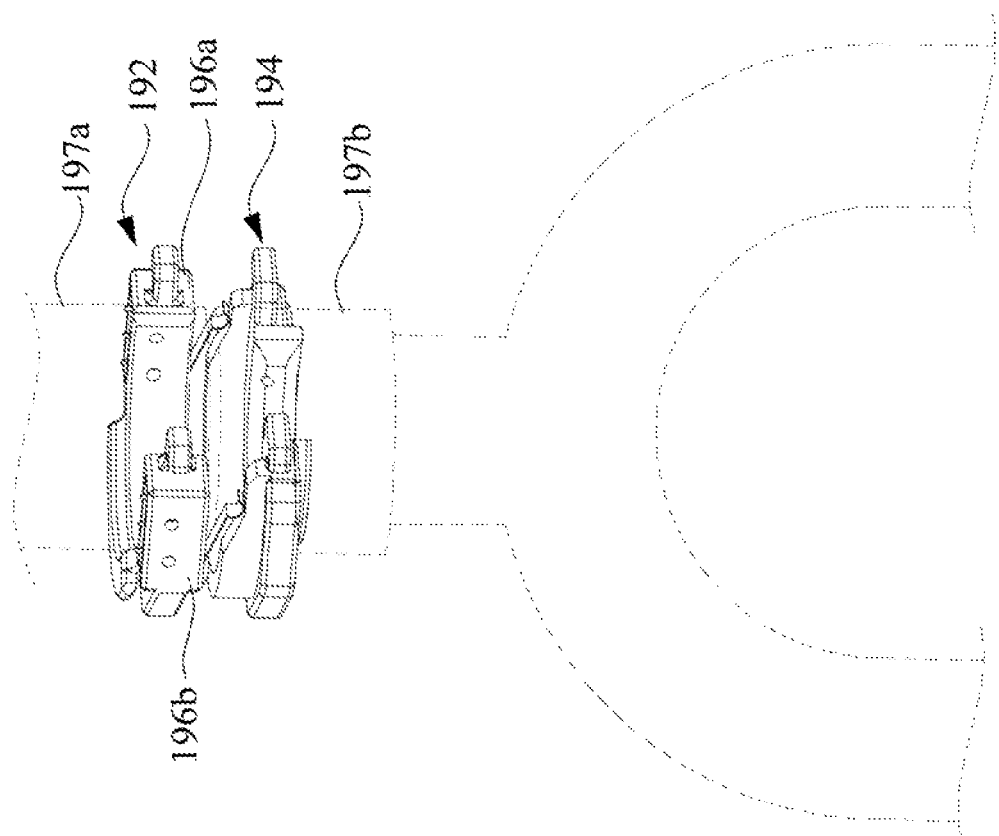
FIG. 15 illustrates a perspective view of a rotation sensing module of a bicycle electronic driving operation system installed on a head tube of the bicycle according to an embodiment of the present disclosure.

Reference is made to FIGS. 14-15, FIG. 14 illustrates a perspective view of a rotation sensing module of a bicycle electronic driving operation system according to an embodiment of the present disclosure, and FIG. 15 illustrates an application status diagram of a rotation sensing module of a bicycle electronic driving operation system installed on a head tube of the bicycle according to an embodiment of the present disclosure. The rotation sensing module 190 includes an upper arc portion 192 and a lower arc portion 194. The upper arc portion 192 has two touch sensors 196*a* and 196*b*, and is fixed to the head tube 197*a* of the hand-bar stem 105 of the bicycle (the hand-bar stem 105 is rotatably connected in the head tube 197*a*). The sensing pieces 198*a* and 198*b* of the touch sensors 196*a* and 196*b* are located between the upper arc portion 192 and the lower arc portion 194. In some embodiments, the terminals 199*a* and 199*b* of the touch sensors 196*a* and 196*b* are electrically connected to the front assembly 120 and the rear assembly 150. In some embodiments, the rotation sensing module 190 has a wireless communication module 193 (embedded in the upper arc portion 192), the touch sensors 196*a* and 196*b* are electrically connected to the wireless communication module 193 for transmitting signals to the front assembly 120 or rear assembly 150 through the wireless communication module 193, so as to control the direction indicator lights to light up or a buzzer to sound a warning. The lower arc portion 194 is fixed on the fork top 197*b* of the bicycle and rotates synchronously with the fork top 197*b*. Referring to FIG. 1, the hand-bar stem 105 is connected to the fork top 197*b* through the head tube 197*a*, and drives the fork top 197*b* to rotate synchronously. A top surface of the lower arc portion 194 includes an arc plane 195 and two slopes 195*a* and 195*b*. The two slopes 195*a* and 195*b* face the two sensing pieces 198*a* and 198*b* of the touch sensors respectively. The end of each sensing piece 198*a* and 198*b* has a semicircular structure to facilitate sliding on the top surface (i.e., the arc plane 195 and the two slopes 195a and 195b) of the lower arc portion 194. When the bicycle is about to turn, the hand-bar stem 105 of the bicycle drives the fork top 197b to rotate synchronously relative to the head tube 197a, and drives the lower arc portion 194 to rotate relative to the upper arc portion 192. One of two sensing pieces 198a and 198b of the two touch sensors 196a and 196b is actuated by one of the two slopes 195a and 195b, thereby causing a corresponding direction indicator light (a left-turning direction indicator light or a right-turning direction indicator light) of the front assembly 120 and rear assembly 150 to light up or sound alarm to sound.

In sum, the bicycle electronic driving operation system disclosed herein achieves safety protection functions such as electronic rearview mirror and projection warning area light by means of its front and rear assembly. It can also sense vehicle speed, braking, steering and other driving conditions through sensors. In addition, the electronic driving operation system can be installed without modifying the bicycle body.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A bicycle electronic driving operation system configured to be installed on a bicycle, the bicycle electronic driving operation system comprising:
   a front assembly having a display panel, wherein the front assembly is detachably mounted on a hand-bar stem of the bicycle;
   a rear assembly having a rear camera module and a projection warning area light, wherein the rear assembly is detachably mounted on a seat post of the bicycle; and
   a rotation sensing module fixed on a head tube of the bicycle and configured to sense a turning direction of the hand-bar stem, wherein the rotation sensing module includes an upper arc portion fixed to the head tube and a lower arc portion fixed to a fork top of the bicycle,
   wherein the rear camera module is configured to capture surrounding images, the display panel is electrically connected to the rear camera module and configured to display the surrounding images captured by the rear camera module, and the projection warning area light are configured to project towards two lateral sides of the bicycle to mark a warning area on a ground on the two lateral sides of the bicycle.

2. The bicycle electronic driving operation system of claim 1, wherein the projection warning area light comprises two laser projection modules, and the seat post is located between the two laser projection modules.

3. The bicycle electronic driving operation system of claim 2, wherein the rear assembly comprises a casing, the casing comprises an upper casing and a lower casing, the lower casing has two projection openings, and the two laser projection modules are configured to project light beams to the ground through the two projection openings respectively.

4. The bicycle electronic driving operation system of claim 3, wherein the rear assembly has a circuit control board and a circuit board decorative cover, the circuit control board is electrically connected to the two laser projection modules and the rear camera module, and the circuit control board is located in a chamber formed of the circuit board decorative cover and the lower casing.

5. The bicycle electronic driving operation system of claim 1, wherein the upper arc portion has two touch sensors, the lower arc portion has two slopes facing the two touch sensors respectively.

6. The bicycle electronic driving operation system of claim 5, wherein the front assembly or the rear assembly comprises a plurality of direction indicator lights, the two touch sensors are electrically connected to the front assembly or the rear assembly, and when the lower arc portion rotates relative to the upper arc portion, one of the two touch sensors is actuated by a corresponding one of the two slopes to cause a corresponding one of the direction indicator lights to light up.

7. The bicycle electronic driving operation system of claim 1, further comprising:
   a brake sensing module fixed on a brake wire of the bicycle and configured to sense whether the brake wire is pulled.

8. A bicycle comprising:
   a bicycle body comprising a hand-bar stem, a seat post and a rear wheel; and
   an electronic driving operation system comprising a front assembly and a rear assembly, wherein the front assembly is detachably mounted on the hand-bar stem, the rear assembly is detachably mounted on the seat post,
   wherein the bicycle body includes a rotation sensing module coupled with a head tube of the bicycle and configured to sense a turning direction of the hand-bar stem, the rotation sensing module includes an upper arc portion fixed to the head tube and a lower arc portion fixed to a fork top of the bicycle,
   wherein the front assembly has a display panel, the rear assembly has a rear camera module and a projection warning area light, the rear camera module is configured to capture surrounding images around the bicycle, the display panel is electrically connected to the rear camera module for displaying the surrounding images captured by the rear camera module, the projection warning area light is configured to emit light beams toward two lateral sides of the bicycle body to mark a warning area on a ground on the two lateral sides of the bicycle body, and the warning area is configured to define safety distances from two lateral sides and a rear side of the rear wheel.

9. The bicycle of claim 8, wherein the projection warning area light comprises two laser projection modules, and the rear wheel is located between the two laser projection modules.

10. The bicycle of claim 9, wherein the rear assembly comprises a casing, and the casing comprises an upper casing and a lower casing, wherein the lower casing has two projection openings, such that the two laser projection modules are configured to project light beams to the ground through the two projection openings respectively.

11. The bicycle of claim 8, wherein the bicycle body further includes a brake sensing module fixed on a brake wire of the bicycle body and configured to sense whether the brake wire is pulled.

12. The bicycle of claim 8, wherein the upper arc portion has two touch sensors, the lower arc portion has two slopes facing the two touch sensors respectively.

13. The bicycle of claim 12, wherein the front assembly or the rear assembly comprises a plurality of direction indicator lights, the two touch sensors are electrically connected to the front assembly or the rear assembly, when the lower arc portion rotates relative to the upper arc portion, one of the two touch sensors is actuated by a corresponding one of the two slopes to cause a corresponding one of the direction indicator lights to light up.

* * * * *